BEST AVAILABLE COPY
5675X
Sheet 1, of sheets
L. Morris.
Inclined Plane for Canals.
Patented Oct. 13, 1839.
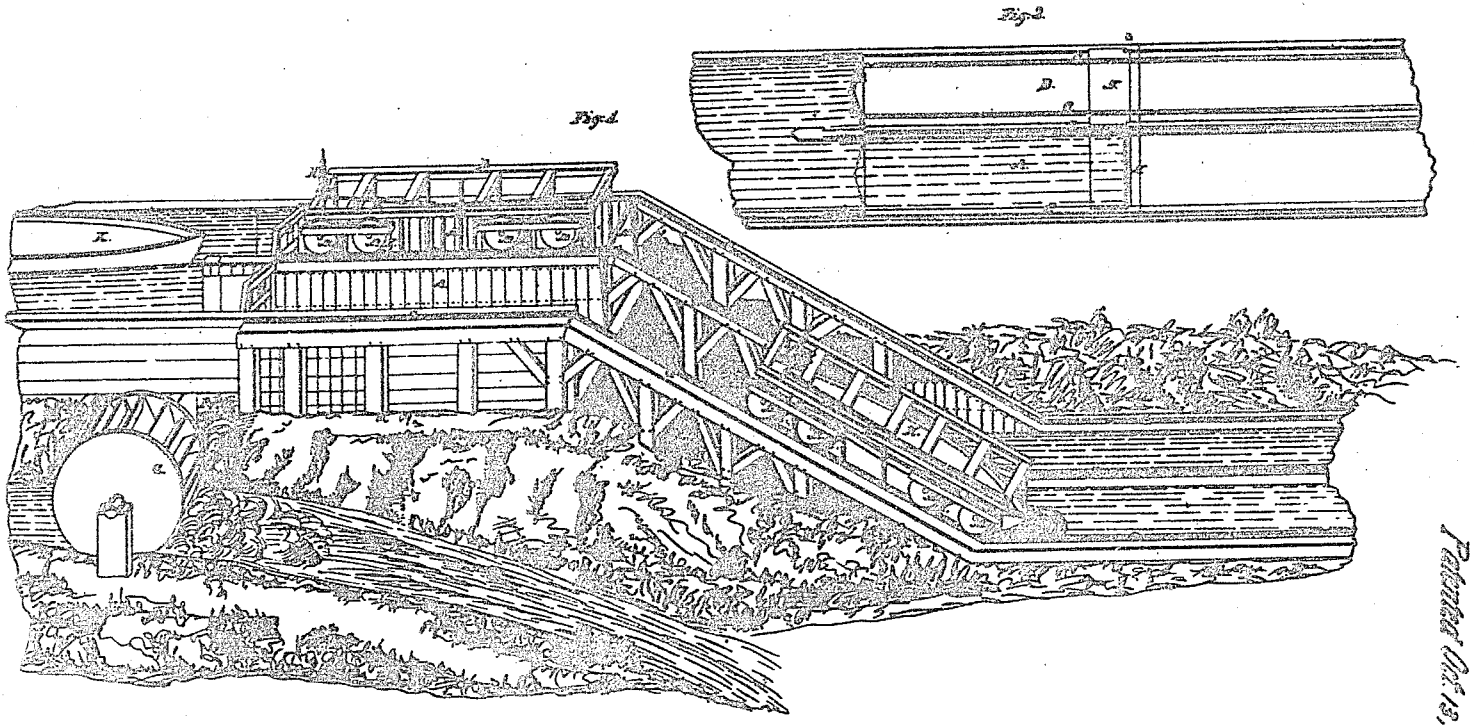
THE GRAPHIC CO. PHOTO-LITH. 39 & 41 PARK PLACE, N.Y.

Sheet 2. 2 Sheets.
E. Morris.
5675X
Inclined Plane for Canals.
Patented Oct. 13, 1829.
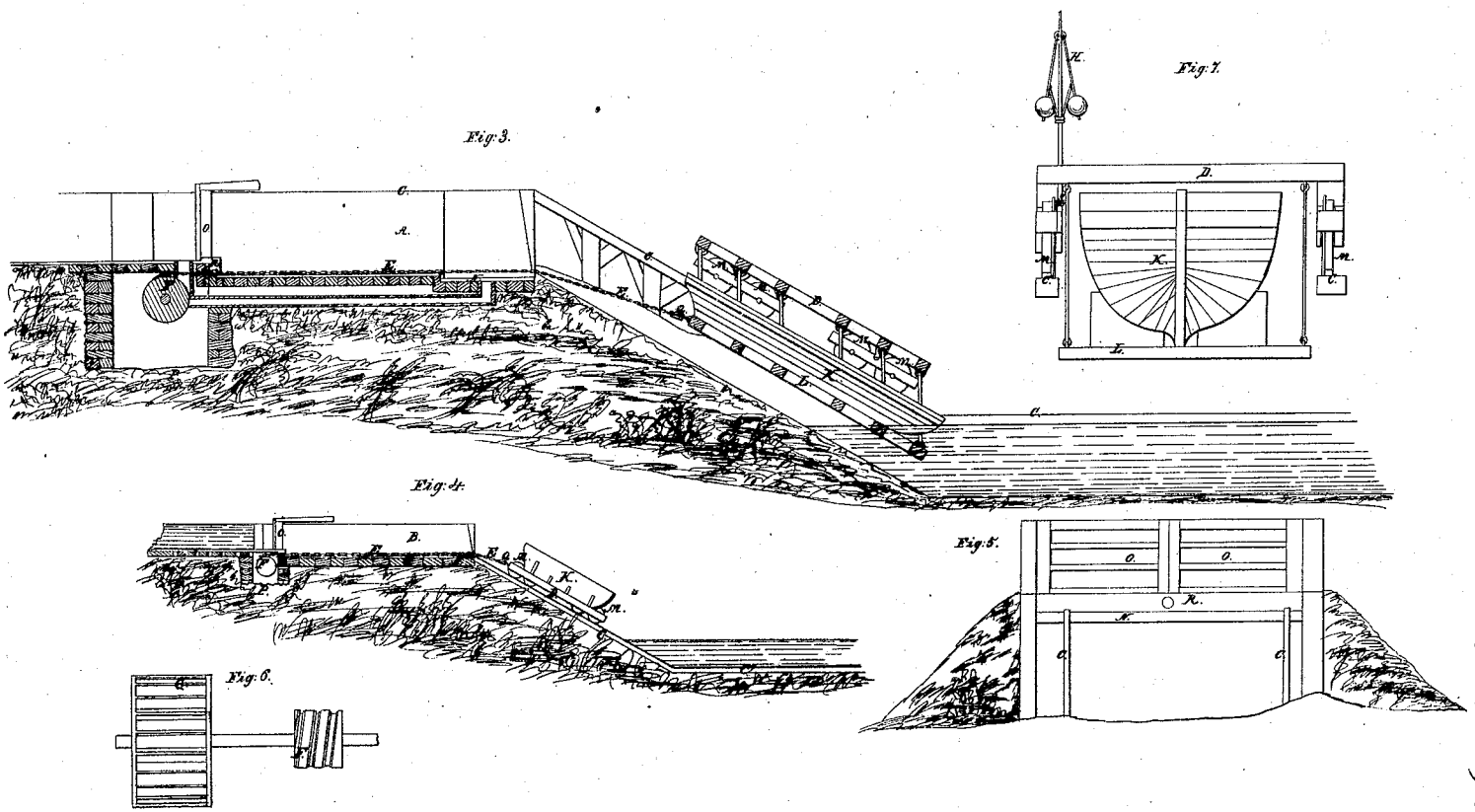
THE GRAPHIC CO. PHOTO-LITH. 39 & 41 PARK PLACE, N.Y.